United States Patent
Ryu et al.

(10) Patent No.: US 9,703,145 B2
(45) Date of Patent: Jul. 11, 2017

(54) LIQUID CRYSTAL COMPOSITION

(71) Applicant: LG CHEM, LTD., Seoul (KR)

(72) Inventors: Su Young Ryu, Daejeon (KR); Moon Soo Park, Daejeon (KR); Jun Won Chang, Daejeon (KR); Sin Young Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 31 days.

(21) Appl. No.: 14/442,032

(22) PCT Filed: Nov. 29, 2013

(86) PCT No.: PCT/KR2013/011043
§ 371 (c)(1),
(2) Date: May 11, 2015

(87) PCT Pub. No.: WO2014/084688
PCT Pub. Date: Jun. 5, 2014

(65) Prior Publication Data
US 2015/0301386 A1  Oct. 22, 2015

(30) Foreign Application Priority Data

Nov. 29, 2012 (KR) .................. 10-2012-0137403
Nov. 29, 2013 (KR) .................. 10-2013-0147865

(51) Int. Cl.
| | | |
|---|---|---|
| *G02F 1/13363* | (2006.01) | |
| *C09K 19/02* | (2006.01) | |
| *C09K 19/38* | (2006.01) | |
| *C09K 19/52* | (2006.01) | |
| *C09K 19/04* | (2006.01) | |
| *C09K 19/20* | (2006.01) | |
| *G02F 1/1335* | (2006.01) | |

(52) U.S. Cl.
CPC .......... *G02F 1/13363* (2013.01); *C09K 19/02* (2013.01); *C09K 19/3809* (2013.01); *C09K 19/52* (2013.01); *C09K 2019/0448* (2013.01); *C09K 2019/2035* (2013.01); *C09K 2019/2078* (2013.01); *C09K 2019/521* (2013.01); *C09K 2019/523* (2013.01); *C09K 2219/03* (2013.01); *G02F 2001/133562* (2013.01); *G02F 2001/133633* (2013.01); *G02F 2201/50* (2013.01)

(58) Field of Classification Search
CPC .... C09K 19/02; C09K 19/52; C09K 19/3809; C09K 2019/0448; C09K 2019/2035; C09K 2019/2078; C09K 2019/523; C09K 2019/521; C09K 2219/03; G02F 1/13363; G02F 2001/133633
See application file for complete search history.

(56) References Cited

U.S. PATENT DOCUMENTS

| | | | | |
|---|---|---|---|---|
| 7,527,746 | B2 * | 5/2009 | Syundo ............. | C09K 19/2007 252/299.01 |
| 2005/0200779 | A1 * | 9/2005 | Ishikawa .......... | G02F 1/133632 349/118 |
| 2006/0172090 | A1 | 8/2006 | Syundo | |
| 2010/0259502 | A1 * | 10/2010 | Ema .................... | G02F 1/13338 345/174 |

FOREIGN PATENT DOCUMENTS

| | | |
|---|---|---|
| JP | 2005-309255 A | 11/2005 |
| JP | 2007-332266 A | 12/2007 |
| JP | 2007-332270 A | 12/2007 |
| JP | 2007-332275 A | 12/2007 |
| JP | 2007-332290 A | 12/2007 |
| JP | 2007-332291 A | 12/2007 |
| JP | 2008-019434 A | 1/2008 |
| KR | 10-2009-0035940 A | 4/2009 |
| TW | 2012336546 A1 | 8/2012 |

OTHER PUBLICATIONS

English translation for JP 2008-019434 provided by Espacenet.*

* cited by examiner

*Primary Examiner* — Cynthia H Kelly
*Assistant Examiner* — Anna Malloy
(74) *Attorney, Agent, or Firm* — Dentons US LLP

(57) ABSTRACT

A liquid crystal composition and a method of manufacturing an optical film. The liquid crystal composition which may form a liquid crystal layer having excellent optical characteristics and a high surface hardness. The liquid crystal layer formed as described above may be used in various applications, and for example, may be disposed on the outermost surface of a display device, such as an LCD or an OLED, or at an outer side of a polarizing layer of the display in which the polarizing layer is disposed at a visible side, thereby serving as a liquid crystal layer which may solve a problem of degrading brightness occurring when an observer watches an image with polarizing sunglasses.

10 Claims, No Drawings

LIQUID CRYSTAL COMPOSITION

This application is a National Stage Entry of International Application No. PCT/KR2013/011043, filed on Nov. 29, 2013, which claims priority to and the benefit of Korean Patent Application No. 10-2012-0137403, filed on Nov. 29, 2012, and Korean Patent Application No. 10-2013-0147865, filed on Nov. 29, 2013, all of which are hereby incorporated herein by reference in their entirety.

TECHNICAL FIELD

The present application relates to a liquid crystal composition and a method of manufacturing an optical film.

BACKGROUND

A display device such as a liquid crystal display (LCD) or an organic light emitting display (OLED) may include a polarizing layer to control optical characteristics or prevent reflection. For example, when such display devices are seen by polarizing sunglasses, according to a relationship between the polarizing layer in the device and a polarizing axis of the polarizing sunglasses, brightness of an image seen by an observer is degraded, or an image may not be seen in some cases. The patent document 1 proposed a structure of a display device, by which the above-described problem can be solved.

PRIOR ART DOCUMENT (Patent document 1) Korean Laid-Open Patent Application No. 2009-0035940

DETAILED DESCRIPTION

Technical Object

The present application provides a liquid crystal composition and a method of manufacturing an optical film.

Technical Solution

One aspect of the present application provides an illustrative liquid crystal composition, which may include a polymerizable liquid crystal material. In the specification, the liquid crystal material is a component formed of a polymerizable liquid crystal compound which will be described below, for example, any one of or a mixture of at least two of the following polymerizable liquid crystal compounds.

The liquid crystal composition may form a layer having an alignment property, excellent optical characteristics after being cured in an aligned state, and a high hardness. A liquid crystal composition not having an alignment property does not correspond to the liquid crystal composition used herein. The liquid crystal layer formed as described above may be applied in various applications, and may be disposed, for example, at the outermost side of the display device, or at an outside of the polarizing layer of the display device including a polarizing layer, which is formed at a visible side. The term "outside or outer surface" used herein may refer to, unless particularly defined otherwise, a direction of a part of the display device showing an image, for example, a direction of an observer watching the display device. In addition, here, the polarizing layer of the visible side may refer to a polarizing layer disposed the outermost, that is, the closest to the observer when the display device includes at least two polarizing layers. In addition, here, the outer side of the polarizing layer may refer to a direction of the polarizing layer toward the observer.

As described above, the liquid crystal composition may be configured to form a layer having alignment and a high hardness when cured. For example, the liquid crystal composition is cured, thereby forming a layer having a surface hardness of 1 H or more, 2 H or more, 3 H or more, or 4 H or more. The surface hardness of the liquid crystal layer may be obtained, for example, by controlling a composition of the liquid crystal composition, which will be described below. The liquid crystal layer having surface hardness in the above range is suitable to be disposed at the outermost side. Here, the surface hardness is a pencil hardness measured at a pencil load of 500 g and a pencil moving rate of 250 mm/min according to ASTM D3363. The upper limit of the surface hardness is not particularly limited, but may be, for example, 8 H or less, 7 H or less, or 6 H or less.

To have a surface hardness in the above range after being cured, the liquid crystal composition may be controlled in various methods. For example, as to be described below, a method of including a multifunctional polymerizable liquid crystal compound in the liquid crystal material in a suitable ratio or more, further adding a compound having a functional group capable of reacting with the polymerizable liquid crystal compound, or controlling a ratio of the multifunctional polymerizable liquid crystal compound in the liquid crystal material and further adding a compound having a functional group capable of reacting with the polymerizable liquid crystal compound may be used.

The term "polymerizable liquid crystal compound" used herein may refer to a compound including a part having liquid crystallinity, for example, a mesogen backbone, and at least one polymerizable functional group.

To ensure suitable hardness, the liquid crystal material may be formed of only a multifunctional polymerizable liquid crystal compound, or may include a multifunctional polymerizable liquid crystal compound and a monofunctional polymerizable liquid crystal compound in a suitable ratio.

The term "multifunctional polymerizable liquid crystal compound" used herein may be a compound including at least two polymerizable functional groups of the liquid crystal compounds. In one example, the multifunctional polymerizable liquid crystal compound may include 2 to 10, 3 to 8, 3 to 6, 3 to 5, 3 to 4, 2, or 3 polymerizable functional groups. In addition, the term "monofunctional polymerizable liquid crystal compound" used herein may refer to a compound including one polymerizable functional group of the liquid crystal compounds.

The multifunctional or monofunctional polymerizable liquid crystal compound may be, for example, a compound represented by Formula 1. In case of the multifunctional compound, at least two polymerizable functional groups of Formula 1 may be included, and in case of the monofunctional compound, one polymerizable functional group of Formula 1 may be included.

[Formula 1]

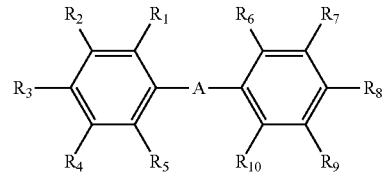

In Formula 1, A is a single bond, —COO—, or —OCO—, $R_1$ to $R_{10}$ are each independently hydrogen, a halogen, an alkyl group, an alkoxy group, an alkoxycarbonyl group, a cyano group, a nitro group, —O-Q-P, —OC(=O)—O-Q-P, or a substituent of Formula 2. Benzene substituted with —O-Q-P is formed by connecting a pair of adjacent substituents of $R_1$ to $R_5$ or a pair of adjacent substituents of $R_6$ to $R_{10}$, and here, at least one of $R_1$ to $R_{10}$ is —O-Q-P or a substituent of Formula 2. Benzene substituted with —O-Q-P is formed by connecting a pair of adjacent substituents of $R_1$ to $R_5$ or a pair of adjacent substituents of $R_6$ to $R_{10}$, and here, Q is an alkylene group or an alkylidene group, and P is a polymerizable functional group such as an alkenyl group, an epoxy group, a cyano group, a carboxyl group, an acryloyl group, a methacryloyl group, an acryloyloxy group, or a methacryloyloxy group.

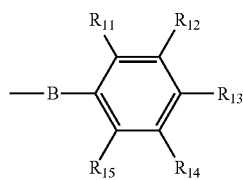

[Formula 2]

In Formula 2, B is a single bond, —COO—, or —OCO—, $R_{11}$ to $R_{15}$ are each independently hydrogen, a halogen, an alkyl group, an alkoxy group, an alkoxycarbonyl group, a cyano group, a nitro group, —O-Q-P, or —OC(=O)—O-Q-P. Benzene substituted with —O-Q-P is formed by connecting a pair of adjacent substituents of $R_{11}$ to $R_{15}$, and here, at least one of $R_{11}$ to $R_{15}$ is —O-Q-P. Benzene substituted with —O-Q-P is formed by connecting a pair of adjacent substituents of $R_{11}$ to $R_{15}$, and here, Q is an alkylene group or an alkylidene group, and P is a polymerizable functional group such as an alkenyl group, an epoxy group, a cyano group, a carboxyl group, an acryloyl group, a methacryloyl group, an acryloyloxy group, or a methacryloyloxy group.

In Formulas 1 and 2, the forming of benzene substituted with —O-Q-P by connecting two adjacent substituents may mean that two adjacent substituents are connected to each other, and thereby a naphthalene backbone substituted with —O-Q-P is formed.

In Formula 2, the mark "-" on the left side of B may indicate that B is directly connected to the benzene of Formula 1.

In Formulas 1 and 2, the term "single bond" refers that there is no atom at the part represented as A or B. For example, in Formula 1, when A is a single bond, the benzenes at both sides of A may be directly connected to each other, thereby forming a biphenyl structure.

In Formulas 1 and 2, the halogen may be, for example, chlorine, bromine, or iodine.

The term "alkyl group" may be, unless particularly defined otherwise, for example, a linear or branched alkyl group having 1 to 20, 1 to 16, 1 to 12, 1 to 8, or 1 to 4 carbon atoms, or a cycloalkyl group having 3 to 20, 3 to 16, or 4 to 12 carbon atoms. The alkyl group may be optionally substituted with at least one substituent.

The term "alkoxy group" may be, unless particularly defined otherwise, an alkoxy group having 1 to 20, 1 to 16, 1 to 12, 1 to 8, or 1 to 4 carbon atoms. The alkoxy group may be a linear, branched, or cyclic type. In addition, the alkoxy group may be optionally substituted with at least one substituent.

The term "alkylene group" or "alkylidene group" may be, unless particularly defined otherwise, an alkylene or alkylidene group having 1 to 12, 4 to 10, or 6 to 9 carbon atoms. The alkylene or alkylidene group may be a linear, branched, or cyclic type. In addition, the alkylene or alkylidene group may be optionally substituted with at least one substituent.

In addition, the term "alkenyl group" may be, unless particularly defined otherwise, an alkenyl group having 2 to 20, 2 to 16, 2 to 12, 2 to 8, or 2 to 4 carbon atoms. The alkenyl group may be a linear, branched, or cyclic type. In addition, the alkenyl group may be optionally substituted with at least one substituent.

In addition, in Formulas 1 and 2, P may be an acryloyl group, a methacryloyl group, an acryloyloxy group, or a methacryloyloxy group, preferably, an acryloyloxy group or a methacryloyloxy group, and more preferably, an acryloyloxy group.

In the specification, as a substituent capable of being substituted with a specific functional group, an alkyl group, an alkoxy group, an alkenyl group, an epoxy group, an oxo group, an oxetanyl group, a thiol group, a cyano group, a carboxyl group, an acryloyl group, a methacryloyl group, an acryloyloxy group, a methacryloyloxy group, or an aryl group may be used, but the present application is not limited thereto.

In case of the monofunctional polymerizable liquid crystal compound, —O-Q-P or a residue of Formula 2 including the —O-Q-P, one of which may be present one in Formula 1, may be present at any one of $R_2$, $R_3$, $R_4$, $R_7$, $R_8$, or $R_9$, for example, and when the residue of Formula 2 is present, the —O-Q-P may be present at one of $R_{12}$, $R_{13}$, and $R_{14}$. In addition, substituents linked to each other, thereby constituting benzene substituted with —O-Q-P may be, for example, $R_3$ and $R_4$, or $R_{12}$ and $R_{13}$.

In case of the multifunctional polymerizable liquid crystal compound, for example, a bifunctional or tri- or higher functional polymerizable liquid crystal compound, —O-Q-P or a residue of Formula 2 including the —O-Q-P may be present at at least two of $R_2$, $R_3$, $R_4$, $R_7$, $R_8$, or $R_9$, and when the residue of Formula 2 is present, the —O-Q-P may be present at one of $R_{12}$, $R_{13}$, and $R_{14}$. As the tri- or higher functional polymerizable liquid crystal compound, for example, the residue of Formula 2 is present at any one of $R_{12}$, $R_{13}$, and $R_{14}$, and a polymerizable liquid crystal compound in which —O-Q-P is present at one or two of $R_2$, $R_3$, and $R_4$ and one or two of $R_{12}$, $R_{13}$, and $R_{14}$ may be used.

In the polymerizable liquid crystal compound of Formula 1 or the residue of Formula 2, a substituent other than —O-Q-P or the residue of Formula 2, or a substituent other than the substituent linked to each other thereby forming benzene, may be, for example, hydrogen, a halogen, a linear or branched alkyl group having 1 to 4 carbon atoms, an alkoxycarbonyl group including a linear or branched alkoxy group having 1 to 4 carbon atoms, a cycloalkyl group having 4 to 12 carbon atoms, an alkoxy group having 1 to 4 carbon atoms, a cyano group, or a nitro group, and in another example, may be chlorine, a linear or branched alkyl group having 1 to 4 carbon atoms, a cycloalkyl group having 4 to 12 carbon atoms, an alkoxy group having 1 to 4 carbon atoms, an alkoxycarbonyl group including a linear or branched alkoxy group having 1 to 4 carbon atoms, or a cyano group.

In one example, to satisfy the above-described surface hardness, the liquid crystal material may include the multifunctional polymerizable liquid crystal compound in an amount of at least 50 weight % or more. The upper limit of a ratio of the multifunctional polymerizable liquid crystal compound in the liquid crystal material is not particularly limited. For example, all of polymerizable liquid crystal compounds included in the liquid crystal material may be multifunctional polymerizable liquid crystal compound. In addition, in consideration of processability or alignment, a monofunctional polymerizable liquid crystal compound may be further included, and when the monofunctional polymerizable liquid crystal compound is included, an amount of the multifunctional polymerizable liquid crystal compound in the liquid crystal material may be, for example, approximately 50 to 90, 50 to 80, 50 to 70, or 50 to 60 weight %.

As the multifunctional polymerizable liquid crystal compound, a bifunctional polymerizable liquid crystal compound having usually two polymerizable functional groups is used. However, in consideration of efficiency of ensuring a surface hardness, as the multifunctional polymerizable liquid crystal compound, at least 3 polymerizable functional groups, for example, 3 to 10, 3 to 8, or 3 to 6 polymerizable liquid crystal compounds (hereinafter, referred to as a tri- or higher functional polymerizable liquid crystal compound) may be used, or a mixture of a bifunctional polymerizable liquid crystal compound and the tri- or higher functional polymerizable liquid crystal compound may be used. When the tri- or higher functional polymerizable liquid crystal compound is used, an amount of the tri- or higher functional polymerizable liquid crystal compound is not particularly limited, but for example, may be 8 weight % or more, 8 to 20, 8 to 15, or 10 to 15 weight % with respect to the liquid crystal material. As described above, when the tri- or higher functional polymerizable liquid crystal compound is used, it is preferable to form a layer having a higher surface hardness, for example, a surface hardness of 2 or 3H or more.

In another example, to ensure the surface hardness, the liquid crystal composition may further include a reactive non-liquid crystal compound. The term "reactive non-liquid crystal compound" used herein may refer to a compound having a functional group capable of reacting with a polymerizable functional group of the polymerizable liquid crystal compound. The reactive compound may be, for example, a non-liquid crystal compound having no liquid crystallinity. The reactive compound may have two or more, three or more, or four or more, and preferably, four or more functional groups capable of reacting with the polymerizable functional group. The upper limit of the functional group in the reactive compound is not particularly limited. However, when there are too many functional groups, they may have an influence on the alignment property of liquid crystals, and thus usually 10 or less, 8 or less, or 6 or less functional groups may be present.

The reactive compound may react with the polymerizable liquid crystal compound to control the hardness of the liquid crystal layer in the process of forming a liquid crystal layer.

As the functional group that can react with a polymerizable functional group, for example, a functional group including an ethylene-like unsaturated double bond, which may be crosslinked or polymerized with a liquid crystal compound by a free radical reaction may be used. As such a functional group, one or at least two of an alkenyl group, an epoxy group, a cyano group, a carboxyl group, an acryloyl group, or a methacryloyl group may be included. As the functional group, a vinyl group, an allyl group, an acryloyl group, or a methacryloyl group may be used, or an acryloyl group or a methacryloyl group may be used, but the present application is not limited.

In one example, the reactive compound may be a compound having 2 or more, 3 or more, or 4 or more functional groups capable of reacting with a polymerizable liquid crystal compound, and having a molecular weight or a weight average molecular weight of 200 to 5,000 or 200 to 1,000. In the ranges of the number of such functional groups, and a molecular weight or a weight average molecular weight, the compound may ensure a suitable surface hardness without diminishing a retardation characteristic of the liquid crystal layer. The functional group of the compound may usually be 10 or less, 8 or less, or 6 or less.

As the reactive compound, a multifunctional acrylate such as trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, triglycerol di(meth)acrylate, tripropyleneglycol di(meth)acrylate, tetraethyleneglycol di(meth)acrylate, pentaerythritol di(meth)acrylate, 1,6-hexanediol di(meth)acrylate, glycerol di(meth)acrylate, tris[2-(acryloyloxy)ethyl] isocyanurate, urethane acrylate, glycerol 1,3-diglycerolate di(meth)acrylate, or tri(propyleneglycol)glycerolate diacrylate; an alkenyl (meth)acrylate such as vinyl (meth)acrylate or allyl (meth)acrylate; an alkoxy polyalkyleneglycol (meth)acrylate such as butoxy triethyleneglycol (meth)acrylate; a succinic acid acryloyloxyalkylester such as mono-2-(acryloyloxy)ethyl succinate; a (meth)acryloyloxyalkyl (meth)acrylate such as 3-(acryloyloxy)-2-hydroxypropyl (meth)acrylate; a (meth)acrylamide or a derivative thereof such as (meth)acrylamide, diacetone (meth)acrylamide, N-[tris(hydroxymethyl)methyl]acrylamide, N,N-(1,2-dihydroxyethylene)bisacrylamide, N,N-(1,2-dihydroxyethylene)bisacrylamide, or N,N-methylenebis(acrylamide); an acetamidoacrylic acid alkyl ester such as methyl 2-acetamidoacrylate; a triazine substituted with a (meth)acryloyl group or an alkenyl group such as 1,3,5-triacryloylhexahydro-1,3,5-triazine or 2,4,6-triallyloxy-1,3,5-triazine; an isocyanurate substituted with an epoxy group such as tris (2,3-epoxypropyl) isocyanurate; a tetracyanoalkylene oxide such as tetracyanoethylene oxide; a carboxylate substituted with an alkenyl group such as triallyl benzene tricarboxylate; a caprolactone (meth)acryloyloxyalkyl ester such as caprolactone 2-((meth)acryloyloxy)ethyl ester; a maleic acid (meth)acryloyloxyalkyl ester such as mono-2-((meth)acryloyloxy)ethyl malate; a polyvalent carboxylic acid such as 1,2,3-triazole-4,5-dicarboxylic acid; an alkanediol substituted with an alkenyl group such as 3-allyloxy-1,2-propanediol; an alkane substituted with a glycidyl oxyphenyl group such as bis[4-(glycidyloxy)phenyl]methane; a dioxalene compound substituted with an alkenyl group such as 2-vinyl-1,3-dioxalene; or a poly(melamine-co-formaldehyde) may be used, but the present application is not limited thereto. The term "(meth)acryl" used herein refers to acryl or methacryl.

The illustrative reactive compound may be optionally substituted with at least one substituent.

In one example, as the reactive compound, a multifunctional acrylate may be used. As the multifunctional acrylate, pentaerythritol triacrylate, dipentaerythritol hexaacrylate, tris[2-(acryloyloxy)ethyl]isocyanurate, or urethane acrylate may be used, but the present application is not limited thereto. Here, as the urethane acrylate, a compound commercially produced by Cytec as the trade name of EB1290, UP135, UP111, or UP128 may be used.

For example, as the reactive compound, a compound represented by Formula 3 or 4 may be used.

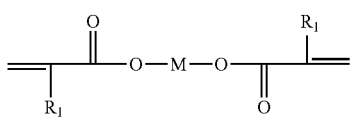

[Formula 3]

In Formula 3, M is an alkylene group or an alkylidene group, and $R_1$ is hydrogen or an alkyl group.

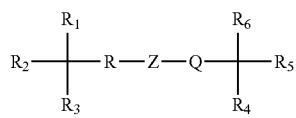

[Formula 4]

In Formula 4, Z may be an oxygen atom, a nitrogen atom, a sulfur atom, an alkylene group, or an alkylidene group, R and Q may be each independently an alkylene group or an alkylidene group, and $R_1$ to $R_6$ may be each independently hydrogen, a halogen, an alkyl group, an alkoxy group, an alkoxycarbonyl group, a cyano group, a nitro group, a (meth)acryloyl group, or a (meth)acryloyloxy group. However, in Formula 4, two or more, three or more, four or more, five or more, or all of $R_1$ to $R_6$ are (meth)acryloyl groups or (meth)acryloyloxy groups.

An alkylene or alkylidene group at M of Formula 3 or R, Z, and O of Formula 4 may be a linear, branched, or cyclic alkylene or alkylidene group having 1 to 20, 1 to 16, or 3 to 16 carbon atoms, and may be optionally substituted with at least one substituent. In addition, the cyclic structure may also include a spiro structure or a combination cyclic structure such as a structure in which two ring structures are condensed with sharing a carbon atom, as well as a general ring type.

In Formulas 3 and 4, details on a halogen, an alkyl group, an alkoxy group, or an alkoxycarbonyl group may be the same as described in Formula 1.

When the reactive compound is included, the liquid crystal material may or may not include a multifunctional polymerizable liquid crystal compound, but to ensure a suitable surface hardness, a multifunctional polymerizable liquid crystal compound may be included. When the multifunctional polymerizable liquid crystal compound is included, the multifunctional polymerizable liquid crystal compound may be included in the liquid crystal material in an amount of approximately 45 weight % or more. The upper limit of the ratio of the multifunctional polymerizable liquid crystal compound is not particularly limited. For example, all of the polymerizable liquid crystal compound included in the liquid crystal material may be a multifunctional polymerizable liquid crystal compound. When a monofunctional polymerizable liquid crystal compound is added, an amount of the multifunctional polymerizable liquid crystal compound in the liquid crystal material may be, for example, approximately 45 to 90, 45 to 80, 45 to 70, or 45 to 60 weight %.

When the reactive compound is included, as the multifunctional polymerizable liquid crystal compound, a bifunctional polymerizable liquid crystal compound or a mixture of a bifunctional polymerizable liquid crystal compound and a tri- or higher functional polymerizable liquid crystal compound may be used, and when the tri- or higher functional polymerizable liquid crystal compound is used, a ratio of the tri- or higher functional polymerizable liquid crystal compound may be, but is not particularly limited to, for example, 8 weight % or more, 8 to 20, 8 to 15, or 10 to 15 weight % with respect to the weight of the liquid crystal material.

The reactive compound may be included in an amount of 5 parts by weight or less, less than 5 parts by weight, 4 parts by weight or less, or 3.5 parts by weight or less relative to 100 parts by weight of the polymerizable liquid crystal material in the liquid crystal composition. When an amount of the reactive non-liquid crystal compound is excessively high, the alignment property of liquid crystals may be degraded. The lower limit of an amount of the reactive non-liquid crystal compound is not particularly limited, and may be, for example, 0.5 parts by weight or 1 part by weight.

A liquid crystal composition including the reactive non-liquid crystal compound, or including a multifunctional polymerizable liquid crystal compound in addition to the non-liquid crystal compound may be suitable to form a layer having a surface hardness of 2 H or 3 H or more after being cured, and particularly, a liquid crystal composition including the non-liquid crystal compound and a tri- or higher functional polymerizable liquid crystal compound may be suitable to form a layer having a surface hardness of 3 H or more.

The liquid crystal composition may further include an antistatic agent as will be described below to control a sheet resistance when needed. As the antistatic agent, various kinds may be used without particular limitation as long as having compatibility suitable for another component constituting the liquid crystal composition.

For example, as the antistatic agent, a suitable inorganic or organic salt may be used.

A cation included in the inorganic salt may be an alkali metal cation or an alkali earth metal cation. In this case, a particular example of the cation may be one or at least two of a lithium ion ($Li^+$), a sodium ion ($Na^+$), a potassium ion ($K^+$), a rubidium ion ($Rb^+$), a cesium ion ($Cs^+$), a beryllium ion ($Be^{2+}$), a magnesium ion ($Mg^{2+}$), a calcium ion ($Ca^{2+}$), a strontium ion ($Sr^{2+}$), and a barium ion ($Ba^{2+}$), and preferably, one or at least two of a lithium ion ($Li^+$), a sodium ion ($Na^+$), a potassium ion ($K^+$), a cesium ion ($Cs^+$), a beryllium ion ($Be^{2+}$), a magnesium ion ($Mg^{2+}$), a calcium ion ($Ca^{2+}$) and a barium ion ($Ba^{2+}$). On aspects of ion stability and mobility, a lithium ion ($Li^+$) may be used, but the present application is not limited thereto.

An organic salt may include an onium cation. The term "onium cation" used herein may refer to an ion charged as positive, in which at least some charges are polarized to at least one atom selected from the group consisting of nitrogen (N), phosphorus (P), and sulfur (S). In the specification, the onium cation may be a cyclic or non-cyclic compound, and in case of the cyclic compound, an aromatic saturated or unsaturated compound may be used. In addition, here, in case of the cyclic compound, in addition to the nitrogen, phosphorus, or sulfur atom, at least one hetero atom (e.g., oxygen) may be contained. In addition, the cyclic or non-cyclic compound may be optionally substituted with a substituent such as hydrogen, halogen, alkyl or aryl. In addition, in case of the non-cyclic compound, at least one, preferably, at least four substituents may be included, and here, the substituent may be a cyclic or non-cyclic substituent, or an aromatic or non-aromatic substituent.

In one aspect, the onium cation may contain a nitrogen atom, and may be, for example, an ammonium ion. Here, the ammonium ion may be a quaternary ammonium ion or an aromatic ammonium ion. As the ammonium ion, an N-ethyl-N,N-dimethyl-N-(2-methoxyethyl)ammonium ion, an N,N- diethyl-N-methyl-N-(2-methoxyethyl)ammonium ion, an N-ethyl-N,N-dimethyl-N-propylammonium ion, an N-methyl-N,N,N-trioctylammonium ion, an N,N,N-trimethyl-N-propylammonium ion, a tetrabutylammonium ion, a tetramethylammonium ion, a tetrahexylammonium ion, or an N-methyl-N,N,N-tributylammonium ion may be used, but the present application is not limited thereto.

As the aromatic ammonium ion, at least one selected from the group consisting of pyridinium, pyridazinium, pyrimidinium, pyrazinium, imidazolium, pyrazolium, thiazolium, oxazolium, and triazolium may be used, and specifically, for example, one or at least two of N-alkyl pyridinium substituted with an alkyl group having 4 to 16 carbon atoms; 1,3-alkylmethyl imidazolium substituted with an alkyl group having 2 to 10 carbon atoms; and 1,2-dimethyl-3-alkylimidazolium substituted with an alkyl group having 2 to 10 carbon atoms may be used, but the present application is not limited thereto.

In the antistatic agent, an anion included in the inorganic or organic salt having the above-described cation may be, but is not limited to, at least one selected from the group consisting of fluoride ($F^-$), chloride ($Cl^-$), bromide ($Br^-$), iodide ($I^-$), perchlorate ($ClO_4^-$), hydroxide ($OH^-$), carbonate ($CO_3^{2-}$), nitrate ($NO_3^-$), sulfonate ($SO_4^-$), methylbenzenesulfonate ($CH_3(C_6H_4)SO_3^-$), p-toluenesulfonate ($CH_3C_6H_4SO_3^-$), carboxybenzenesulfonate ($COOH(C_6H_4)SO_3^-$), trifluoromethanesulfonate ($CF_3SO_2^-$), benzonate ($C_6H_5COO^-$), acetate ($CH_3COO^-$), trifluoroacetate ($CF_3COO^-$), tetrafluoroborate ($BF_4^-$), tetrabenzylborate ($B(C_6H_5)_4^-$), hexafluorophosphate ($PF_6^-$), trispentafluoroethyl trifluorophosphate ($P(C_2F_5)_3F_3^-)^-$), bistrifluoromethanesulfonimide ($N(SO_2CF_3)_2^-$), bispentafluoroethanesulfonimide ($N(SOC_2F_5)_2^-)_5$ bispentafluoroethanecarbonylimide ($N(COC_2F_5)_2^-$), bisperfluorobutanesulfonimide ($N(SO_2C_4F_9)_2^-$), bisperfluorobutanecarbonylimide ($N(COC_4F_9)_2^-$), tristrifluoromethanesulfonylmethide ($C(SO_2CF_3)_3^-$), and tristrifluoromethanecarbonylmethide ($C(SO_2CF_3)_3^-$). An imide-based anion may be used to serve as an electron withdrawer, and to increase ion stability with substituted with fluorine having good hydrophobicity. A ratio of the antistatic agent in the liquid crystal composition is not particularly limited, and may be suitably selected in consideration of an optical characteristic of the liquid crystal layer and a range of sheet resistance to be described below.

The liquid crystal composition including the antistatic agent may form a layer having a sheet resistance of, for example, approximately $10^{12}\Omega$ or less, $10^{11}\Omega$ or less, $10^{10}\Omega$ or less, or $10^9\Omega$ or less. Usually, the liquid crystal layer has a high sheet resistance of approximately $10^{13}\Omega$, and when the layer having the sheet resistance in such a range is disposed at the outermost side, it probably gives a damage to a product because of vulnerability to static electricity. However, the liquid crystal composition may be prepared to have a sheet resistance in the above range when needed, and thus can prevent the above-described problem. Here, the lower limit of the sheet resistance of the liquid crystal layer is not particularly limited, and the sheet resistance may be determined within a range of, for example, $10^7\Omega$ or more or $10^8\Omega$ or more.

The liquid crystal composition may further include an optional additive required for the polymerizable liquid crystal composition, for example, a surfactant, a leveling agent, a non-polymerizable liquid crystal compound, or a polymerization initiator in a suitable ratio, in addition to the above-described components.

Another aspect of the present application provides a method of manufacturing an optical film. For example, the method may include forming a layer of the above-described liquid crystal composition on an alignment layer, and polymerizing a liquid crystal compound in a state in which a liquid crystal compound in the liquid crystal composition is aligned.

The alignment layer may be formed on, for example, a suitable base layer. As a base layer, for example, a glass base layer or a plastic base layer may be used. As the plastic base layer, a sheet or film including a cellulose resin such as triacetyl cellulose (TAC) or diacetyl cellulose (DAC); a cyclo olefin polymer (COP) such as a norbornene derivative; an acryl resin such as poly(methyl methacrylate) (PMMA); polycarbonate (PC); polyolefin such as polyethylene (PE) or polypropylene (PP); polyvinyl alcohol (PVA); poly ether sulfone (PES); polyetheretherketone (PEEK); polyetherimide (PEI); polyethylenenaphthalate (PEN); polyester such as polyethyleneterephthalate (PET); polyimide (PI); polysulfone (PSF); or a fluorine resin, may be illustrated.

A thickness of the base layer is not particularly limited, and may be suitably controlled depending on its use.

A method of forming the alignment layer on the base layer is not particularly limited, and thus a known method may be applied. The alignment layer may be a layer serving to align a liquid crystal compound in the formation of an optical film. As the alignment layer, a conventional alignment layer known in the art, for example, an alignment layer which is formed by imprinting, a photo-alignment layer, or a rubbing alignment layer may be used. The alignment layer is an optional component, and may provide an alignment property without an alignment layer by directly rubbing or extending the base layer in some cases.

When needed, an antistatic agent may be included in the alignment layer in consideration of a sheet resistance within the above-described range. The kind of the antistatic agent included in this case is not particularly limited, and for example, the kind included in the above-described liquid crystal composition may be applied, and a ratio thereof may be suitably selected without interrupting the alignment property of the alignment layer.

When needed, an antistatic layer may be formed on the base layer used in this method, for example, between the base layer and the alignment layer to control the sheet resistance. A method of forming the antistatic layer is not particularly limited, and includes, for example, coating and curing a composition including a curable resin and an antistatic agent, or depositing the antistatic agent on a desired place. As the curable resin, a conventional resin such as an acryl resin, an epoxy resin, a urethane resin, a phenol resin, or a polyester resin may be used, and in consideration of process convenience, a UV curable acryl binder resin may be used.

The kind of the antistatic agent used to form the antistatic layer is not particularly limited, and for example, the antistatic agent may be an inorganic salt or an organic salt described above, or another conductive material. As the other conductive material, a metal such as tin-doped indium oxide (ITO), antimony-doped zinc oxide (AZO), antimony-doped tin oxide (ATO), SnO, $RuO_2$, $IrO_2$, gold, silver, nickel, copper, and palladium, a metal oxide, or an alloy material; or a conductive polymer such as polyaniline, polyacetylene, polypyrrole, polythiophene, polyparaphenylene, polydienylene, polyphenylene vinylene, polyphenylene sulfide, or polysulfurnitride may be used. As the conductive material, a conductive material in which the above-described metal, metal oxide, or alloy material is deposited on a surface of a core formed of a polymer, thereby forming a shell may be used.

In the formation of the antistatic layer, a blending ratio and thicknesses of the resin and the antistatic agent are not particularly limited, and a known method may be applied in consideration of desired sheet resistance.

A liquid crystal layer may be formed by forming a layer of a liquid crystal composition on an alignment layer and performing polymerization in a state in which a liquid crystal compound is aligned. A method of forming the layer of the liquid crystal composition on the alignment layer is not particularly limited, and a method of applying a composition including the above-described components or a coating solution prepared by diluting the composition in a suitable solvent to the alignment layer by a known coating method may be used.

The polymerizable liquid crystal compound may be parallel-aligned in the process. The term "parallel alignment" used herein may refer to the case in which an optical axis of the liquid crystal layer including a liquid crystal compound has a tilt angle of approximately 0 to 25, 0 to 15, 0 to 10, 0 to 5, or 0 degrees with respect to a planar surface of the liquid crystal layer. A method of parallel-aligning the liquid crystal compound is not particularly limited, and a known method may be applied.

Throughout the above process, a liquid crystal layer may be formed. The liquid crystal layer manufactured by the above method may have an in-plane retardation which can allow a characteristic of retarding a phase by ¼ with respect to at least one wavelength of the range of wavelengths included in a visible region, that is, can allow conversion of incident linearly polarized light into elliptically polarized light or circularly polarized light, or which can allow conversion of the elliptically polarized light or circularly polarized light incident in an opposite direction into linearly polarized light. For example, the liquid crystal layer may have in-plane retardation measured with respect to light with a wavelength of approximately 550 nm of approximately 80 to 200 or 90 to 150 nm. The liquid crystal layer having retardation in such a range may be disposed in a display device, thereby preventing a problem of degradation of brightness which may occur while an image is observed with polarizing sunglasses.

The term "in-plane retardation" used herein is a value measured by Equation 1.

$$R_{in} = d \times (n_x - n_y) \quad \text{[Equation 1]}$$

In Equation 1, $R_{in}$ is in-plane retardation, d is a thickness of the liquid crystal layer, $n_x$ is a refractive index in a slow axis, and $n_y$ is a refractive index in a fast axis.

The liquid crystal layer may or may not have retardation in a thickness direction. For example, the liquid crystal layer may have retardation in a thickness direction with respect to light with a wavelength of 550 nm of approximately −20 to 20 or −10 to 10 nm. The term "retardation in a thickness direction" used herein is a value measured by Equation 2.

$$R_{th} = d \times (n_z - n_y) \quad \text{[Equation 2]}$$

In Equation 2, $R_{th}$ is retardation in a thickness direction, d is a thickness of the liquid crystal layer, $n_z$ is a refractive index in a thickness direction, and $n_y$ is a refractive index in a fast axis direction.

In one example, the liquid crystal layer may have a difference in refractive index between an in-plane slow axis direction and an in-plane fast axis direction of 0.05 to 0.2, 0.07 to 0.2, 0.09 to 0.2, or 0.1 to 0.2. The in-plane refractive index in the slow axis direction may refer to a refractive index in a direction exhibiting the highest refractive index on a plane of the liquid crystal layer, and the in-plane refractive index in the fast axis direction may refer to a refractive index in a direction exhibiting the lowest refractive index on a plane of the liquid crystal layer. Usually, the fast axis is perpendicular to the slow axis in the optically-anisotropic liquid crystal layer. The refractive indexes may be measured with respect to light with wavelengths of 550 and 589 nm, respectively. The difference in refractive index may be measured according to a manufacturer's manual using Axoscan produced by Axomatrix. In addition, the liquid crystal layer may have a thickness of approximately 0.5 to 2.0 μm or 0.5 to 1.5 μm. The liquid crystal layer having the relationship of the refractive indexes and the thickness may realize a phase retardation characteristic suitable for a purpose to be applied, for example, application to the outermost surface of the display device.

Such a liquid crystal layer may be disposed on the display device, for example, the outermost surface of the display device. For example, when the display device is a display device including a polarizing layer disposed to a visible side, the liquid crystal layer may be disposed to an outer side of the polarizing layer, that is, an observer. The kind of the display device is not particularly limited, and for example, may include various LCDs and OLEDs including VA, IPS, TN, and OCB modes.

A location of the liquid crystal layer in the display device and/or an application method are(is) not particularly limited, and a known method may be applied.

For example, the LCD may usually include a back light, an internal polarizing plate, a liquid crystal panel, and a visible side polarizing plate, which are sequentially disposed, and the liquid crystal layer may be disposed to an outside of the visible side of the polarizing plate in this structure.

The OLED may usually include an optical film such as a quarter wave plate (QWP) to prevent reflection of the outside of an organic light emitting diode and a polarizing plate, which are sequentially disposed, and the liquid crystal layer may be disposed to an outside of the polarizing plate.

The use of the liquid crystal layer is not limited, and for example, the liquid crystal layer may be used as a retardation film, a viewing angle compensation film, or a brightness-enhancing film in various modes of LCDs or OLEDs.

Technical Effects

The present application may provides a liquid crystal composition which can form a liquid crystal layer having excellent optical characteristics and a high surface hardness can be provided. The liquid crystal layer formed as described above can be used in various applications, and for example, can be disposed on the outermost surface of a display device, such as an LCD or an OLED, or at an outer side of a polarizing layer of the display in which the polarizing layer is disposed at a visible side, thereby serving as a liquid crystal layer which can solve a problem of degrading brightness occurring when an observer watches an image with polarizing sunglasses.

ILLUSTRATIVE EMBODIMENTS

Hereinafter, an optical film will be described in detail with reference to Examples and Comparative Examples, but the scope of the optical film is not limited to the following Examples.

1. Measurement of Surface Hardness

A surface hardness of liquid crystal layers formed in Examples and Comparative Examples was measured at a pencil weight of 500 g and a pencil moving rate of 250 mm/min according to ASTM D3363.

2. Measurement of Retardation

Retardation was measured using light with a wavelength of 550 or 589 nm. Sixteen Muller matrixes of retardation films were subjected to measurement of retardation according to a manufacturer's manual using equipment capable of measuring sixteen Muller matrixes, Axoscan (Axomatrics), and thus the retardation was extracted.

3. Measurement of Sheet Resistance

Sheet resistance was measured using a sheet resistance measurer, HIRESTA-UP (MCP-HT450; Mitsubishi Chemical), according to a manufacturer's manual.

4. Evaluation of Alignment Property

Aligning properties of liquid crystals in Examples and Comparative Examples were evaluated by placing a liquid crystal layer between two polarizers whose light absorption axes were perpendicular to each other, and observing retardation expressed by a liquid crystal film and its uniformity while irradiating light to one surface.

Structures of polymerizable liquid crystal compounds and reactive non-liquid crystal compounds used in Examples and Comparative Examples were as follows.

Polymerizable Liquid Crystal Compound

Reactive Non-Liquid Crystal Compound

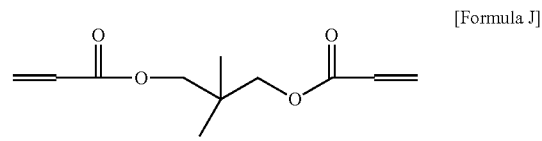

[Formula J]

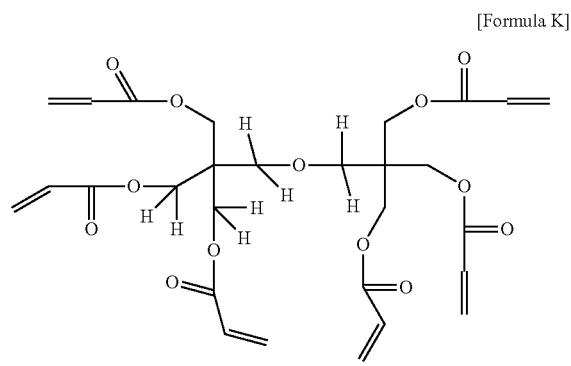

[Formula K]

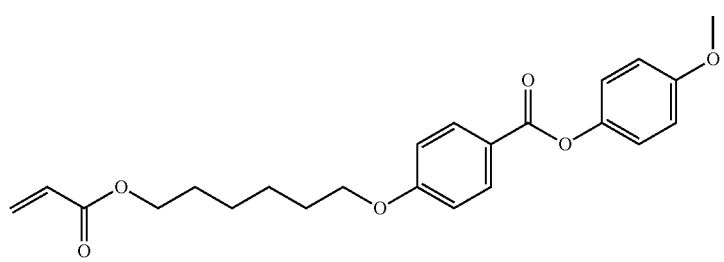

[Formula B]

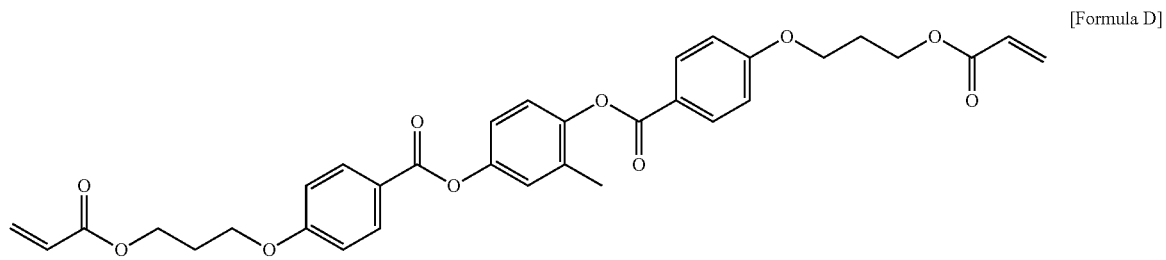

[Formula D]

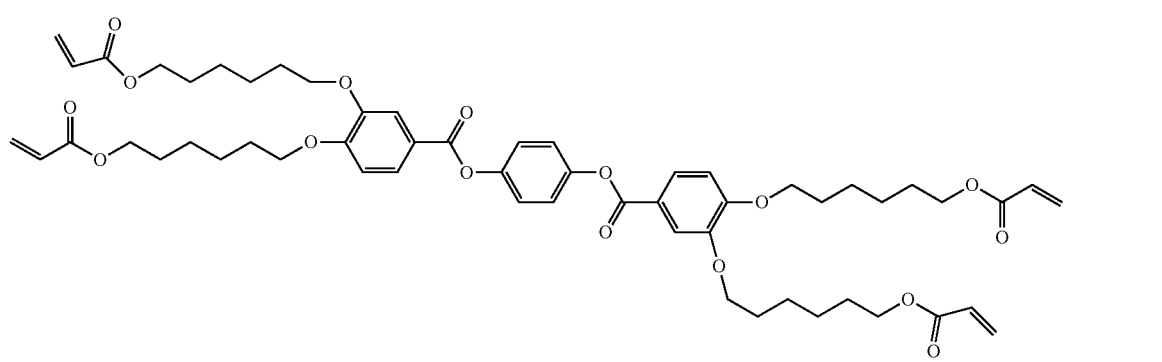

[Formula G]

Examples 1 to 4 and Comparative Examples 1 to 4

A coating solution for forming an alignment layer was prepared by dissolving 20 g of a photoreactive polymer, 5-norbornene-2-methyl-(4-methoxy cinnamate), 20 g of dipentaerythritol hexaacrylate, and 5 g of a photoinitiator (Irgacure OXE02, Ciba-Geigy (Swiss)) in 980 g of cyclopentanone, the coating solution was coated on a triacetyl cellulose (TAC) film to have a thickness after drying of approximately 1,000 Å, and dried with hot wind in a dry oven at 70° C. for 2 minutes, thereby forming a layer. Subsequently, the TAC film having the layer was transferred in one direction, and exposed once at a rate of 3 m/min while irradiating linearly-polarized UV rays to the film using a high pressure mercury lamp (80 w/cm) as a light source and a wire grid polarizing plate (Moxtek), thereby providing an alignment property.

Afterward, a coating solution for forming a liquid crystal layer was prepared by dissolving a mixture prepared by blending 5 parts by weight of a photoinitiator (Irgacure 907, Ciba-Geigy (Swiss)) in 95 parts by weight of a mixture prepared by blending a polymerizable liquid crystal compound in a composition ratio shown in Table 1, and in case, further blending a reactive non-liquid crystal compound, in toluene to have a solid content of approximately 25 weight %. Afterward, the coating solution was coated on the alignment layer to have a thickness after drying of approximately 1 μm, and dried with hot wind in a dry oven at 60° C. for 2 minutes. Then, UV rays were irradiated using a high pressure mercury lamp (80 w/cm) at 300 mJ/cm$^2$, and the coating solution was cured, thereby forming a liquid crystal layer.

TABLE 1

|  |  |  | Example |  |  |  | Comparative Example |  |  |  |
|---|---|---|---|---|---|---|---|---|---|---|
|  |  |  | 1 | 2 | 3 | 4 | 1 | 2 | 3 | 4 |
| RM material | RM compound | B | 50 | 45 | 48.5 | 43.5 | 100 | 70 | 47.5 | 47.5 |
|  |  | D | 50 | 45 | 48.5 | 43.5 |  | 30 | 47.5 | 47.5 |
|  |  | G |  |  | 10 |  |  |  |  |  |
|  | Reactive non-liquid crystal compound | J |  |  |  | 10 |  |  | 5 |  |
|  |  | K |  |  | 3 | 3 |  |  |  | 5 |

Content Unit: g

Results for evaluating physical properties with respect to Examples and Comparative Examples are summarized in Table 2.

TABLE 2

|  | Example |  |  |  | Comparative Example |  |  |  |
|---|---|---|---|---|---|---|---|---|
|  | 1 | 2 | 3 | 4 | 1 | 2 | 3 | 4 |
| Surface hardness | 1H | 2H | 2H | 3H | 2B | 1B | 1H | 2H |
| Aligning properties | ○ | ○ | ○ | ○ | ○ | ○ | X | X |
| In-plane retardation (nm) | approximately 120 to 130 |  |  |  | approximately 120 to 130 |  |  |  |

Alignment property: ○: aligned, X: not aligned

Example 5

A liquid crystal layer was formed through the same process as described in Example 1, except that an antistatic agent (Methacroylcholine Chloride, TCI) was added to a mixture of a polymerizable liquid crystal compound and a reactive non-liquid crystal compound to have a concentration of 3 weight %.

Example 6

A liquid crystal layer was formed through the same process as described in Example 1, except that a cyclo olefin polymer (COP) film on a surface of which a coating layer was formed of a conductive polymer (Aedotron™) manufactured by TDA was used instead of the TAC film.

Example 7

A liquid crystal layer was formed through the same process as described in Example 5, except that a COP film on a surface of which a coating layer was formed of a conductive polymer (Aedotron™) manufactured by TDA was used instead of the TAC film.

Example 8

A liquid crystal film was manufactured through the same process as described in Example 5, except that a coating solution to which a conductive polymer (Aedotron™) manufactured by TDA was added in a ratio of approximately 10 weight % during the preparation of the coating solution for an alignment layer.

Results for measuring sheet resistance with respect to Examples 5 to 8 are summarized in Table 3.

TABLE 3

|  | Example |  |  |  |
|---|---|---|---|---|
|  | 5 | 6 | 7 | 8 |
| Surface hardness | 1H | 1H | 1H | 1H |
| Alignment property | ○ | ○ | ○ | ○ |
| In-plane retardation (nm) | approximately 120 to 130 |  |  |  |
| Sheet resistance (×10$^9$ Ω) | 1000 | 100 | 1 | 1 |

Experimental Example

When optical films manufactured in Examples 1 to 8 and Comparative Examples 1 and 2 were disposed on a visible side polarizing plate of a conventional LCD to have an angle between an absorption axis of the visible side polarizing plate and an optical axis (slow axis) of the liquid crystal layer of approximately 45 degrees, a brightness meter was disposed on a back surface of general polarizing glasses with driving the LCD, and the brightness was measured, when the optical film of Example was present, significant change in the brightness according to change in the polarization axis of the polarizing glasses was not observed. In cases of Comparative Examples 1 and 2, in the beginning, similar results to those of Examples were obtained, but it was confirmed that the films were easily damaged by scratches in use, thereby degrading performance according to time.

What is claimed is:
1. A liquid crystal composition which comprises a polymerizable liquid crystal material comprising a multifunctional polymerizable liquid crystal compound and a monofunctional polymerizable liquid crystal compound and a reactive non-liquid crystal compound comprising at least two functional groups capable of reacting with the polymerizable liquid crystal compound and which is configured to form a layer, of which a surface hardness is 1H or more, by being cured in an aligned state,
- wherein an amount of the multifunctional polymerizable liquid crystal compound in the polymerizable liquid crystal material is 45 to 90 weight %,
- wherein the reactive non-liquid crystal compound is comprised in an amount of 5 parts by weight or less relative to 100 parts by weight of the polymerizable liquid crystal material,
- wherein the multifunctional liquid crystal compound comprises a liquid crystal compound having two polymerizable functional groups and a liquid crystal compound having three or more polymerizable functional groups, and
- wherein an amount of the liquid crystal compound having three or more polymerizable functional groups in the liquid crystal material is 8 to 20 weight %.

2. The composition according to claim 1, wherein the reactive non-liquid crystal compound comprises at least four functional groups capable of reacting with the polymerizable liquid crystal compound.

3. The composition according to claim 2, wherein the non-liquid crystal compound is a compound comprising at least four functional groups capable of reacting with the polymerizable liquid crystal compound, and having a molecular weight or weight average molecular weight of 200 to 5,000 or 200 to 1,000.

4. The composition according to claim 1, which is configured to form a layer, of which a surface hardness is 2 H or more, by being cured.

5. The composition according to claim 1, which is configured to form a layer, of which a sheet resistance is $10^{12}\Omega$ or less.

6. The composition according to claim 5, further comprising an antistatic agent.

7. A method of manufacturing an optical film, comprising: forming a layer of the liquid crystal composition of claim 1 on an alignment layer; and polymerizing the liquid crystal compound under a state where it is aligned.

8. The method according to claim 7, wherein the alignment layer comprises an antistatic agent.

9. The method according to claim 7, wherein the layer of the liquid crystal composition comprises an antistatic agent.

10. The method according to claim 7, wherein the alignment layer is formed on a base layer, and an antistatic layer is between the alignment layer and the base layer.

* * * * *